(12) United States Patent  
McKellery et al.

(10) Patent No.: US 7,744,048 B1
(45) Date of Patent: Jun. 29, 2010

(54) TRIPOD APPARATUS

(76) Inventors: Mahlon McKellery, 1653 W. 10th Pl., Gary, IN (US) 46404; Ray A. Lawson, 1653 W. 10th Pl., Gary, IN (US) 46404

( * ) Notice: Subject to any disclaimer, the term of this patent is extended or adjusted under 35 U.S.C. 154(b) by 58 days.

(21) Appl. No.: 12/263,776

(22) Filed: Nov. 3, 2008

(51) Int. Cl.
*F16M 11/02* (2006.01)
(52) U.S. Cl. .............. 248/177.1; 248/176.1; 248/178.1; 248/188.6
(58) Field of Classification Search .............. 248/176.1, 248/177.1, 178.1, 179.1, 180.1, 188.6, 188.1, 248/163.1
See application file for complete search history.

(56) References Cited

U.S. PATENT DOCUMENTS

| | | | | |
|---|---|---|---|---|
| 1,759,165 | A | * | 5/1930 | Mayer ...................... 248/182.1 |
| 2,579,348 | A | * | 12/1951 | Taylor ...................... 248/178.1 |
| 2,776,102 | A | * | 1/1957 | Schlafly .................... 248/179.1 |
| 3,115,849 | A | * | 12/1963 | Johnson ......................... 108/4 |
| D268,458 | S | | 4/1983 | Schoenig |
| 5,979,856 | A | | 11/1999 | Hsu |
| 6,193,204 | B1 | | 2/2001 | Hsu |
| D450,339 | S | | 11/2001 | Eason |
| 6,748,873 | B2 | | 6/2004 | Brown, Sr. |
| 2002/0056794 | A1 | | 5/2002 | Ibrahim |
| 2007/0131825 | A1 | * | 6/2007 | Skrodzki ................. 248/177.1 |

* cited by examiner

*Primary Examiner*—Amy J Sterling
(74) *Attorney, Agent, or Firm*—Crossley Patent Law; Mark A. Crossley

(57) ABSTRACT

The tripod apparatus provides a tripod stand with player tray for removably holding a variety of media player sizes and shapes. The media players may be any of a variety of such including but not limited to CD players, DVD players, and laptop computers. The adjustability of the player tray provides for players of a variety of widths and depths and also provides elongated eyelets for any players that allow securement through various forms of fasteners. The angled handle of the player tray receiver allows a user to easily adjust direction as chosen. The telescopic stalk of the tripod allows height adjustment. Further, the tray receiver may be pivoted with height angle with the easily-used 45 degree angled handle. The clip on media holder provides holder slots for convenience in storing various media. The apparatus is lightweight, significantly collapsible, and highly portable.

6 Claims, 5 Drawing Sheets

US 7,744,048 B1

TRIPOD APPARATUS

BACKGROUND OF THE INVENTION

While various tripods exist, particularly like those used in holding cameras and music, the present apparatus is a tripod apparatus especially suited to holding a media player, such as that for DVD's. The bracketry adjusts to fit various players. Additionally, an especially useful feature is the media holder which removably clips to the telescopic stalk tripod.

FIELD OF THE INVENTION

The tripod apparatus relates generally to tripods for use as music stands and the like and more especially to a tripod uniquely suited to use with a media player, the apparatus including a clip-on media holder.

SUMMARY OF THE INVENTION

The general purpose of the tripod apparatus, described subsequently in greater detail, is to provide a tripod apparatus which has many novel features that result in an improved tripod apparatus which is not anticipated, rendered obvious, suggested, or even implied by prior art, either alone or in combination thereof.

To attain this, the tripod apparatus provides a tripod stand with player tray for removably holding a variety of media player sizes and shapes. The media players may be any of a variety of such including but not limited to CD players, DVD players, and laptop computers. The adjustability of the player tray provides for players of a variety of widths and depths and also provides elongated eyelets for any players that allow securement through various forms of fasteners. The angled handle of the player tray receiver allows a user to easily adjust direction as chosen. The telescopic stalk of the tripod allows height adjustment. Further, the tray receiver may be pivoted with height angle with the easily-used 45 degree angled handle. The clip on media holder provides holder slots for convenience in storing various media. The apparatus is lightweight, significantly collapsible, and highly portable.

Thus has been broadly outlined the more important features of the improved tripod apparatus so that the detailed description thereof that follows may be better understood and in order that the present contribution to the art may be better appreciated.

An object of the tripod apparatus is to hold a variety of sizes of media players.

Another object of the tripod apparatus is to easily adjust to hold media player sizes.

A further object of the tripod apparatus is to provide stability and adjustable height.

An added object of the tripod apparatus is to provide a media holder for holding a plurality of media to be played in a media player.

These together with additional objects, features and advantages of the improved tripod apparatus will be readily apparent to those of ordinary skill in the art upon reading the following detailed description of presently preferred, but nonetheless illustrative, embodiments of the improved tripod apparatus when taken in conjunction with the accompanying drawings.

In this respect, before explaining the current embodiments of the improved tripod apparatus in detail, it is to be understood that the tripod apparatus is not limited in its application to the details of construction and arrangements of the components set forth in the following description or illustration.

Those skilled in the art will appreciate that the concept of this disclosure may be readily utilized as a basis for the design of other structures, methods, and systems for carrying out the several purposes of the improved tripod apparatus. It is therefore important that the claims be regarded as including such equivalent constructions insofar as they do not depart from the spirit and scope of the tripod apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the tripod apparatus generally designated by the reference number 10 will be described.

Figure 5:
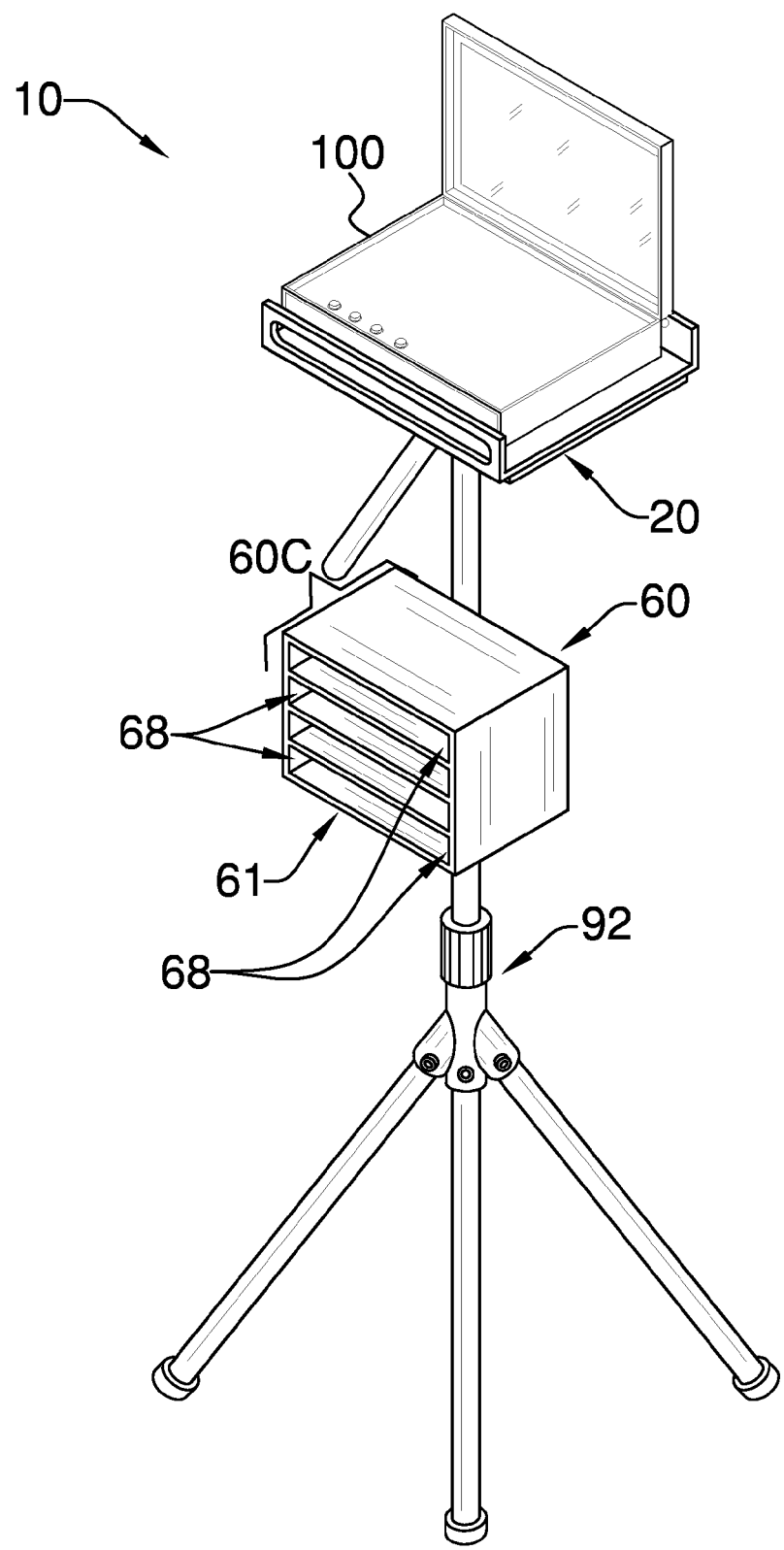
FIG. 5 is a perspective view with typical existing laptop media player fitted within the player tray.

Referring to FIG. 5, the tripod apparatus 10 is provided for removable receipt of an existing media player 100. A variety of players 100 and player 100 sizes are accommodated by the adjustability of the player tray 20. The media holder slots 68 provide for removable storage of various media such as CD's, DVD's or other.

Figure 1:
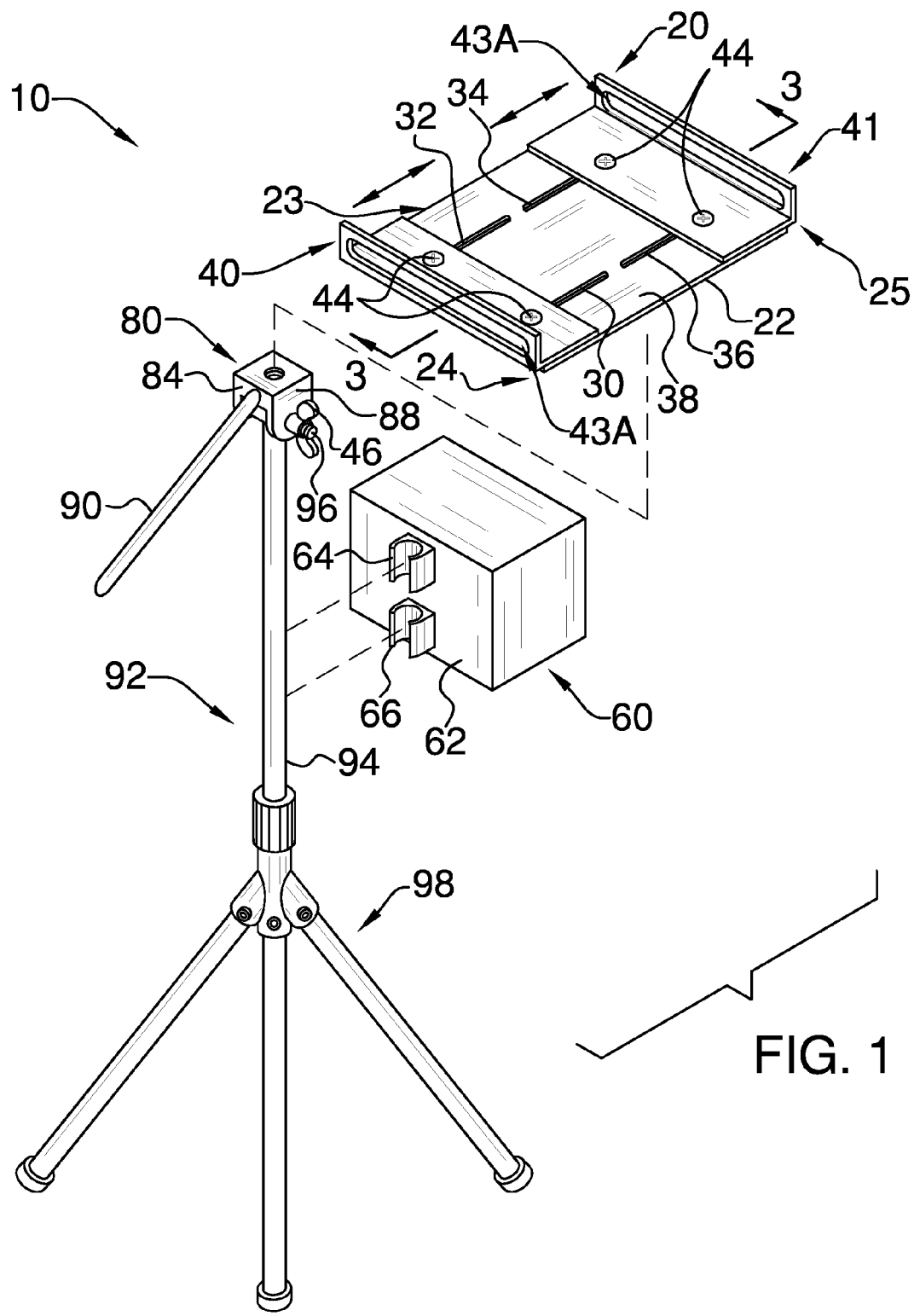
FIG. 1 is a perspective partially exploded view.
Figure 2:
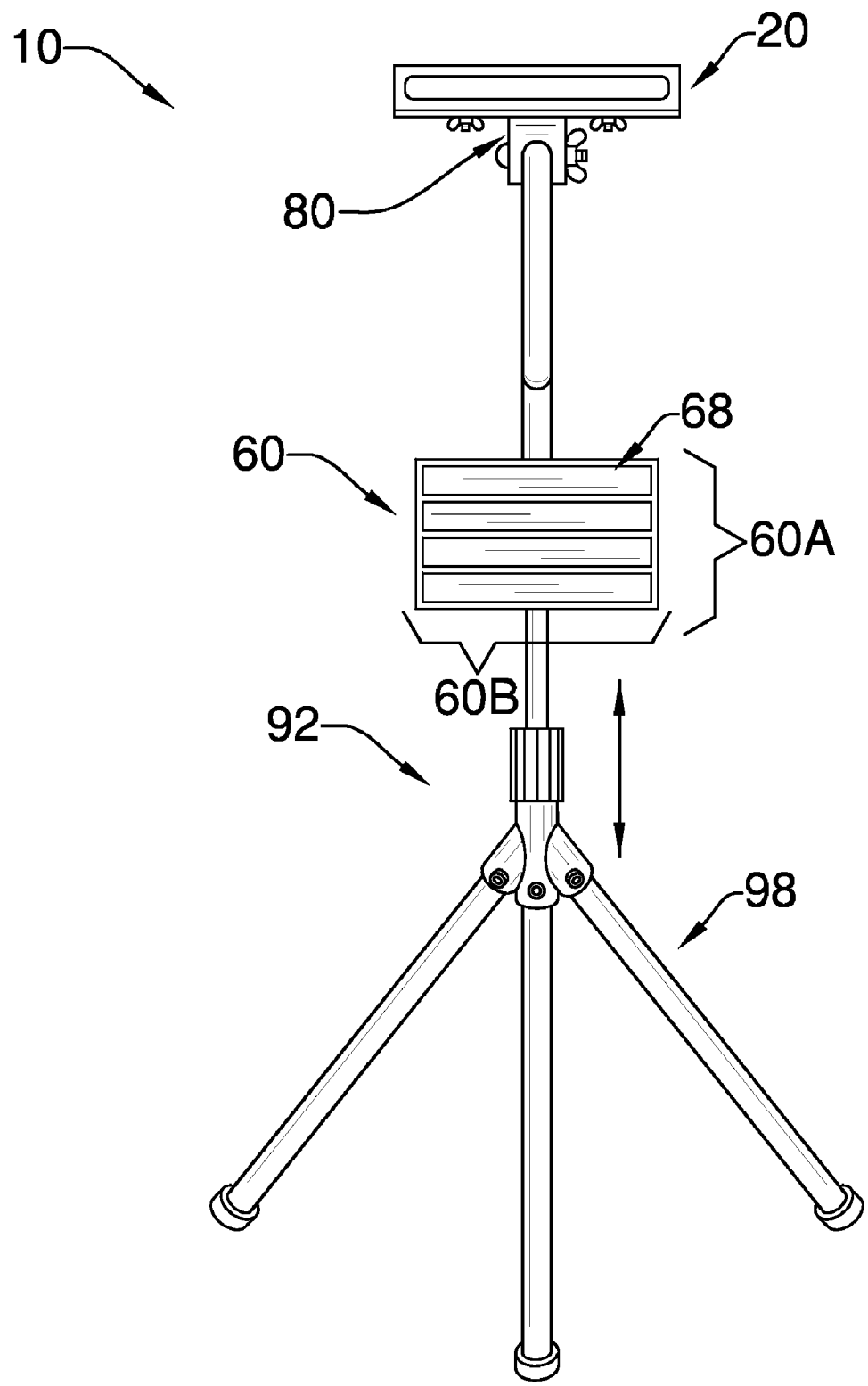
FIG. 2 is a front elevation view.
Figure 3:
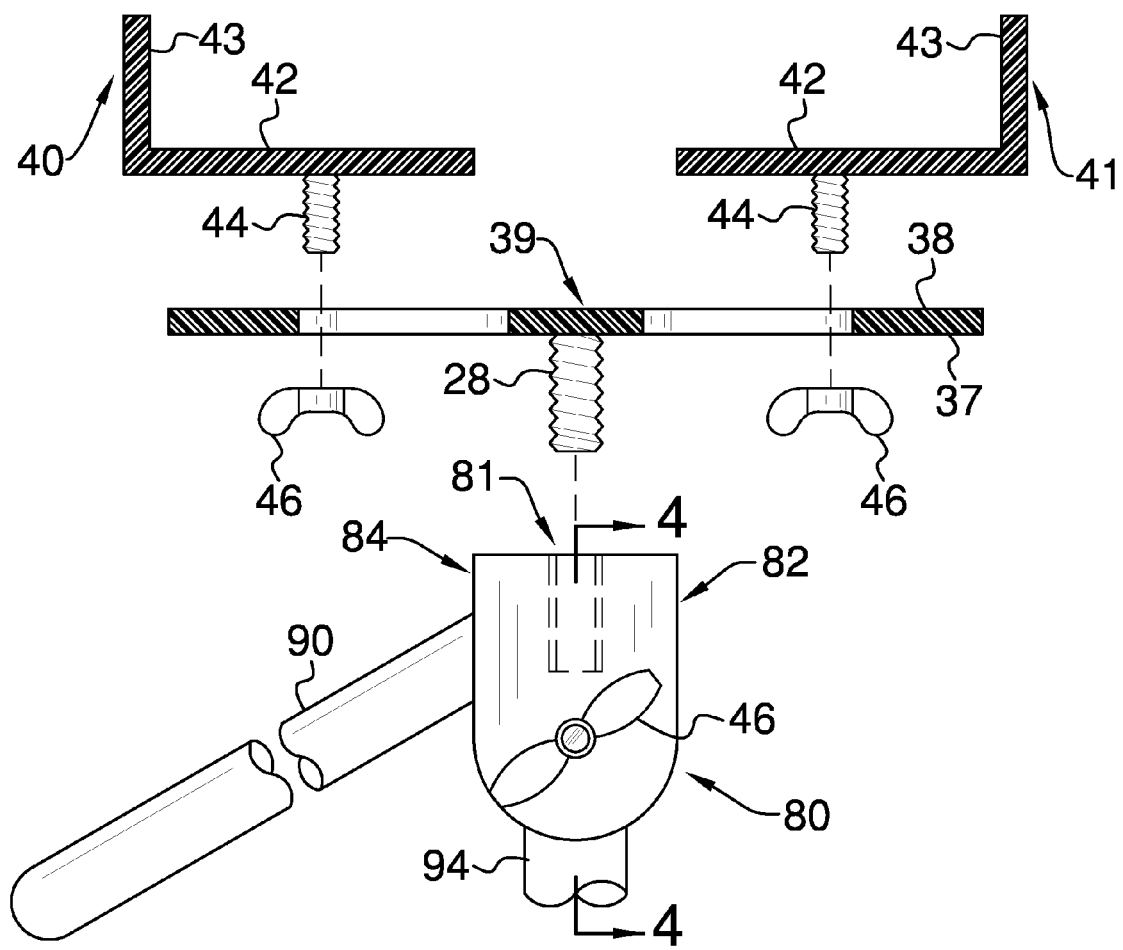
FIG. 3 is a partial cross sectional view of FIG. 1, taken along the line 3-3.

Referring to FIGS. 1, 2, and 3, the tripod apparatus 10 partially comprises the player tray 20 having a first side 22 spaced apart from a second side 23, a third side 24 spaced apart from a fourth side 25, a top 38, a bottom 37, and a center 39. The tray 20 further comprises a quartet of spaced apart elongated slots. Each slot is parallel with the tray 20 first side 22 and second side 23. The slots partially comprise a first elongated slot 30, a second elongated slot 32. The first elongated slot 30 and second elongated slot 32 are disposed most proximal to the tray third side 24. The third elongated slot 34 and fourth elongated slot 36 are disposed most proximal to the tray 20 fourth side 25. The pair of spaced apart L-brackets comprises the first L-bracket 40 and the second L-bracket 41. Each L-bracket comprises a horizontal plane 42 and a vertical plane 43. The horizontal planes 42 are removably fitted to the tray 20 top 38. Each vertical plane 43 has an elongated eyelet 43*a*. The first L-bracket 40 is fitted to the first elongated slot 30 and second elongated slot 32 via a pair of identical sunken fasteners 44. The second L-bracket 41 is fitted to the third elongated slot 34 and the fourth elongated slot 36 via a pair of identical sunken fasteners 44. A wing nut 46 is provided for each sunken fastener 44. Each wing nut 46 is removably fitted to each fastener 44 on the bottom 37 of the player tray 20. While not illustrated as such, the elongated eyelets 43*a* may selectively receive a plurality of existing fasteners of an existing media player 100. An embedded bolt 28 is extended from the center 39 of the tray 20 bottom 37.

Figure 4:
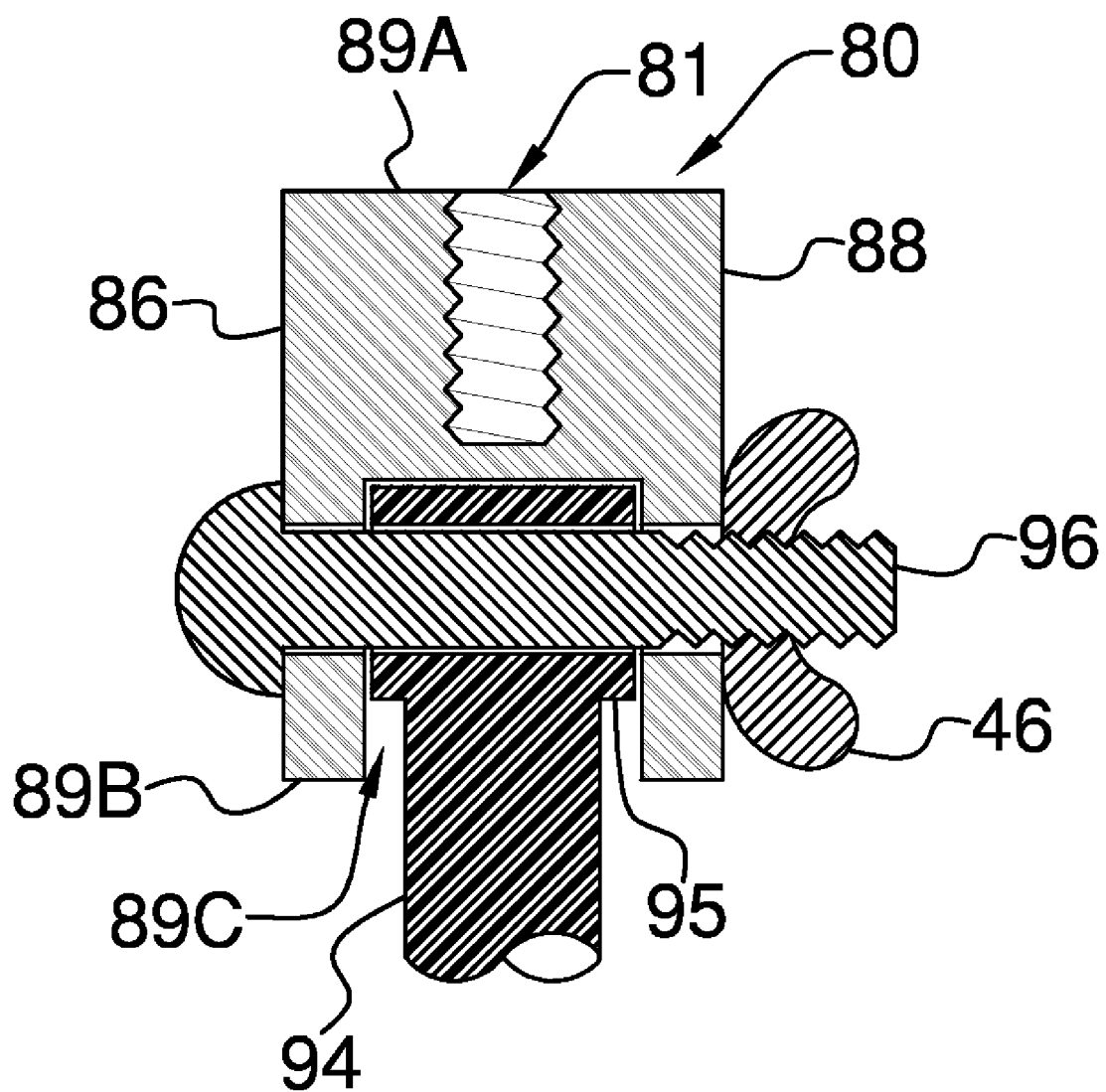
FIG. 4 is a partial cross sectional view of FIG. 3, taken along the line 4-4.

Referring to FIG. 4 and continuing to refer to FIGS. 1 and 3, the tripod 92 comprises a plurality of foldout legs 98. The telescopic stalk 94 is affixed atop the legs 98. The stalk flare 95 is disposed atop the telescopic stalk 94.

The tray receiver 80 is removably affixed to the stalk flare 95. The tray receiver 80 has a receiver front side 82 spaced apart from a receiver back side 84, a receiver left side 86 spaced apart from a receiver right side 88, and a receiver top 89a spaced apart from a receiver bottom 89b. The female thread 81 is disposed in the receiver top 89a. The bottom cavity 89c is disposed in the receiver bottom 89b. The 45 degree angled handle 90 is affixed to the receiver back side 84. The flare bolt 96 is removably and horizontally fitted through the bottom cavity 89c and the stalk flare 95. The bolt 96 secures the tray receiver 80 to the stalk flare 95. The wing nut 46 secures the flare bolt 96. The female thread 81 is in removable receipt of the embedded bolt 28 of the player tray 20.

Referring to FIGS. 1, 2, and 5, the media holder 60 has a front side 61 spaced apart from a back side 62. The media holder 60 has a height 60a, a width 60b, and a depth 60c. A plurality of divided holder slots 68 is disposed within the media holder depth 60c, the slots open to the front side 61. The pair of spaced apart c-clips is affixed to the media holder 60 back side 62. The c-clips comprise the first c-clip 64 spaced apart from the second c-clip 66. The c-clips are removably affixed to the telescopic stalk 94 of the tripod 92.

With respect to the above description then, it is to be realized that the optimum dimensional relationships for the parts of the tripod apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the tripod apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the tripod apparatus may be used.

Therefore, the foregoing is considered as illustrative only of the principles of the tripod apparatus. Further, since numerous modifications and changes will readily occur to those skilled in the art, it is not desired to limit the tripod apparatus to the exact construction and operation shown and described, and accordingly, all suitable modifications and equivalents may be resorted to, falling within the scope of the tripod apparatus.

What is claimed is:

1. A tripod apparatus, comprising, in combination:
    a player tray having a first side spaced apart from a second side, a third side spaced apart from a fourth side, a top, and a bottom, the tray further comprising:
        a pair of slideably adjustable L-brackets, the L-brackets having outwardly and upwardly disposed vertical planes, the L-brackets and tray bottom in removable receipt of an existing media player;
        an embedded bolt extended downwardly from a center of the tray bottom;
    a tripod comprising:
        a plurality of foldout legs;
        a telescopic stalk affixed atop the legs;
        a stalk flare disposed atop the telescopic stalk via a horizontally disposed flare bolt with wing nut;
        a tray receiver pivotally and removably affixed to the stalk flare, the tray receiver having a receiver front side spaced apart from a receiver back side, a receiver left side spaced apart from a receiver right side, a receiver top spaced apart from a receiver bottom;
        a 45 degree angled handle extended downwardly from the receiver back;
        a female thread disposed in the receiver top, the female thread in removable receipt of the embedded bolt of the player tray.

2. The apparatus according to claim 1 further comprising a media holder is removably affixed to the telescopic stalk.

3. The apparatus according to claim 2 wherein the media holder is further affixed via a pair of spaced apart c-clips disposed on the back side of the media holder.

4. A tripod apparatus, comprising, in combination:
    a player tray having a first side spaced apart from a second side, a third side spaced apart from a fourth side, a top, and a bottom, the tray further comprising:
        a pair of slideably adjustable L-brackets, the L-brackets and tray bottom in removable receipt of an existing media player;
        an embedded bolt extended downwardly from a center of the tray bottom;
    a tripod comprising:
        a plurality of foldout legs;
        a telescopic stalk affixed atop the legs;
        a stalk flare atop the telescopic stalk;
        a tray receiver pivotally and removably affixed to the stalk flare, the tray receiver having a receiver front side spaced apart from a receiver back side, a receiver left side spaced apart from a receiver right side, a receiver top spaced apart from a receiver bottom;
        a 45 degree angled handle extended downwardly from the receiver back;
        a female thread disposed in the receiver top, the female thread in removable receipt of the embedded bolt of the player tray;
    a media holder removably affixed to the telescopic stalk, the media holder having a front side spaced apart from a back side, a height, a width, and a depth;
    a plurality if horizontally disposed divided holder slots within the media holder depth, the holder slots open to the media holder front side.

5. The apparatus according to claim 4 wherein the media holder is further affixed via a pair of vertically spaced apart c-clips disposed on the back side of the media holder.

6. A tripod apparatus, comprising, in combination:
    a player tray having a first side spaced apart from a second side, a third side spaced apart from a fourth side, a top, and a bottom, the tray further comprising:
        a quartet of spaced apart elongated slots, each slot parallel with the tray's first side and second side, the slots comprising a first elongated slot and second elongated slot disposed most proximal to the tray third side, a third elongated slot and fourth elongated slot most proximal to the tray's fourth side;
        a pair of spaced apart L-brackets comprising a first L-bracket and a second L-bracket, each L-bracket comprising a horizontal plane and a vertical plane, the horizontal planes removably fitted to the tray top, each vertical plane having an elongated eyelet, the first L-bracket fitted to the first elongated slot and second elongated slot via a pair of identical sunken fasteners, the second L-bracket fitted to the third elongated slot and the fourth elongated slot via a pair of identical sunken fasteners;
        a wing nut for each sunken fastener, each wing nut removably fitted to each fastener on the bottom of the player tray;

an embedded bolt extended downwardly from a center of the tray bottom;

a tripod comprising:

a plurality of foldout legs;

a telescopic stalk affixed atop the legs;

a stalk flare atop the telescopic stalk;

a tray receiver removably affixed to the stalk flare, the tray receiver having a receiver front side spaced apart from a receiver back side, a receiver left side spaced apart from a receiver right side, a receiver top spaced apart from a receiver bottom;

a female thread disposed in the receiver top;

a bottom cavity disposed in the receiver bottom;

a 45 degree angled handle affixed downwardly to the receiver back side;

a horizontally disposed flare bolt removably and horizontally fitted through the bottom cavity and the telescopic stalk flare, the bolt securing the tray receiver to the stalk flare;

a wing nut securing the flare bolt;

the female thread in removable receipt of the embedded bolt of the player tray;

a media holder having a front side spaced apart from a back side, a height, a width, and a depth;

a plurality if divided horizontally disposed holder slots within the media holder depth, the holder slots open to the media holder front side;

a pair of spaced apart vertically disposed c-clips affixed to the media holder back side, the c-clips removably affixed to the telescopic stalk of the tripod.

\* \* \* \* \*